(12) United States Patent
Knittle

(10) Patent No.: US 8,819,269 B2
(45) Date of Patent: Aug. 26, 2014

(54) ADAPTIVE BIT RATE METHOD AND SYSTEM USING RETRANSMISSION AND REPLACEMENT

(75) Inventor: Curtis Knittle, Superior, CO (US)

(73) Assignee: Cable Television Laboratories, Inc.

( * ) Notice: Subject to any disclaimer, the term of this patent is extended or adjusted under 35 U.S.C. 154(b) by 910 days.

(21) Appl. No.: 12/827,164

(22) Filed: Jun. 30, 2010

(65) Prior Publication Data

US 2012/0005368 A1    Jan. 5, 2012

(51) Int. Cl.
*G06F 15/16* (2006.01)
*H04L 12/56* (2006.01)
*H04L 29/06* (2006.01)

(52) U.S. Cl.
CPC .............. *H04L 47/10* (2013.01); *H04L 65/80* (2013.01); *H04L 65/608* (2013.01)
USPC ............................ 709/235; 370/229; 370/230

(58) Field of Classification Search
CPC ... H04L 47/10; H04L 29/06; H04L 29/06095; H04L 29/06115; H04L 47/11; H04L 65/80; H04L 47/2458; H04L 41/5009; H04L 65/608

USPC ........................................................ 709/235
See application file for complete search history.

(56) References Cited

U.S. PATENT DOCUMENTS

| 6,014,694 | A  | * | 1/2000 | Aharoni et al. ............... 709/219 |
| 2004/0105494 | A1 | * | 6/2004 | Aikawa et al. ............ 375/240.13 |
| 2009/0147853 | A1 | * | 6/2009 | Dane et al. ............... 375/240.16 |

FOREIGN PATENT DOCUMENTS

WO    WO 2010060106 A1 * 5/2010 .............. H04L 12/24

* cited by examiner

*Primary Examiner* — Jude Jean Gilles
*Assistant Examiner* — Jaren M Means
(74) *Attorney, Agent, or Firm* — Great Lakes Intellectual Property, PLLC.

(57) ABSTRACT

An adaptive method and system for dynamically facilitating access to higher quality content in the event transport of the higher quality content requires a greater allocation of network resources when compared to transport of the same content at a lower quality.

20 Claims, 2 Drawing Sheets

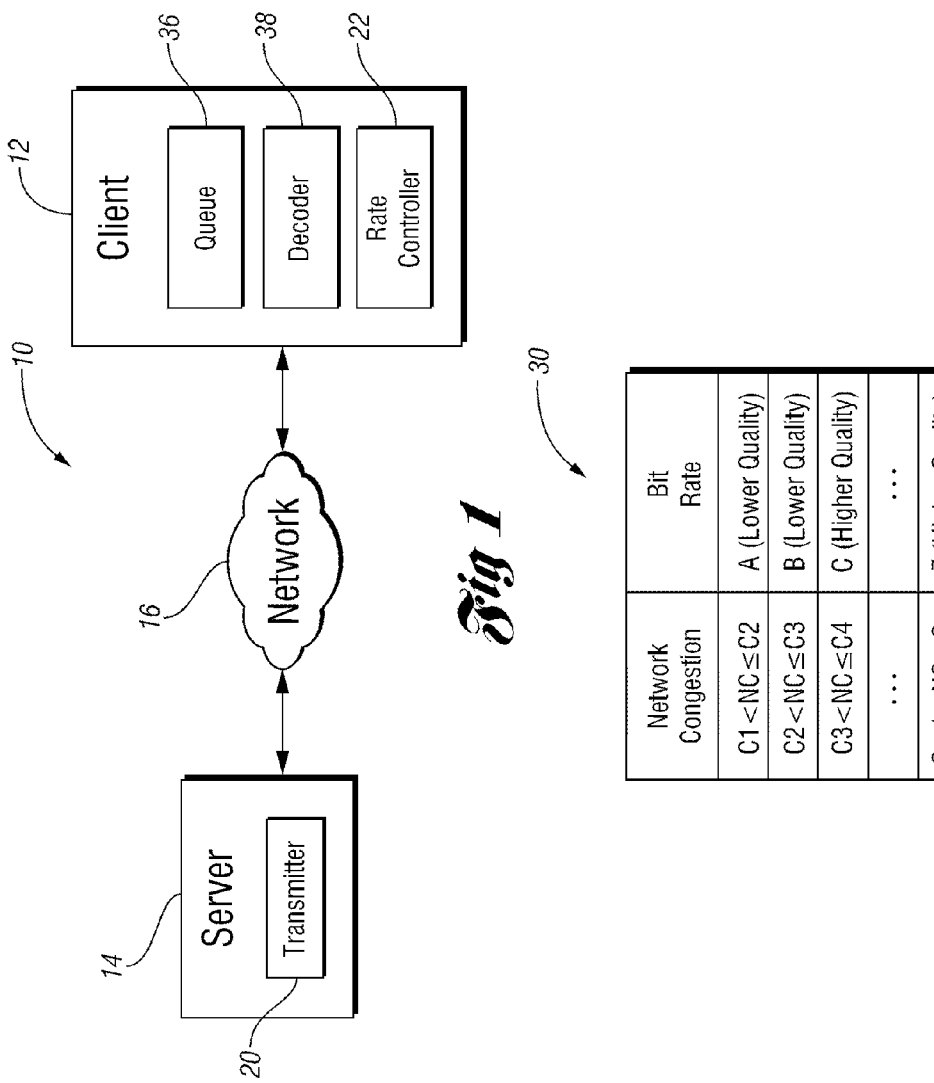

ADAPTIVE BIT RATE METHOD AND SYSTEM USING RETRANSMISSION AND REPLACEMENT

TECHNICAL FIELD

The present invention relates to preparing content for access, such as but not limited to queuing video segments for playback through a device wherein one or more of the queued video segments are replaced with retransmitted higher quality video segments.

BACKGROUND

The transmission of data, and in particular video data, has exposed a problem on bandwidth-limited shared networks related to the fact that video data often requires a high bandwidth and has temporal constraints. Many Internet Protocol networks were designed for data transmissions requiring low bandwidth and tolerant of highly variable packet delays such that these types of networks tend to provide relatively low-bandwidth circuits, which may not satisfy inflexible temporal constraints. Such packet networks were designed for the transfer of data between computer systems. The only constraint being that the data eventually arrive at its destination. The bandwidth available for a transfer depends on the degree of congestion in the network. Such packet networks often make no guarantees about when or even in what order the data in a burst of data will arrive at its destination. Such typical packet network may not be well adapted to handle high-bandwidth, bursty data with time constraints.

For users which do not have sufficiently high bandwidth to stream video or which must contend with other traffic that intermittently diminishes available bandwidth for delivery of packets, adaptive bit rate technologies deliver lower bit rate streams when necessary to maintain continuous viewing by sacrificing some aspects of video quality. If the user's available bandwidth suddenly drops, these adaptive bit rate technologies make use of an adaptive bit rate stream so that the video source will dynamically lower its streaming rate to compensate for this decreased bandwidth and deliver an uninterrupted video viewing experience that has a lower bandwidth requirement. Furthermore, adaptive bit rate technologies may also dynamically increase streaming rates when detecting increased bandwidth is available to deliver uninterrupted video viewing with a higher video quality.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates an adaptive bit rate system in accordance with one non-limiting aspect of the present invention;

FIG. 2 illustrates a bit rate map in accordance with one non-limiting aspect of the resent invention.

DETAILED DESCRIPTION

Figure 3:
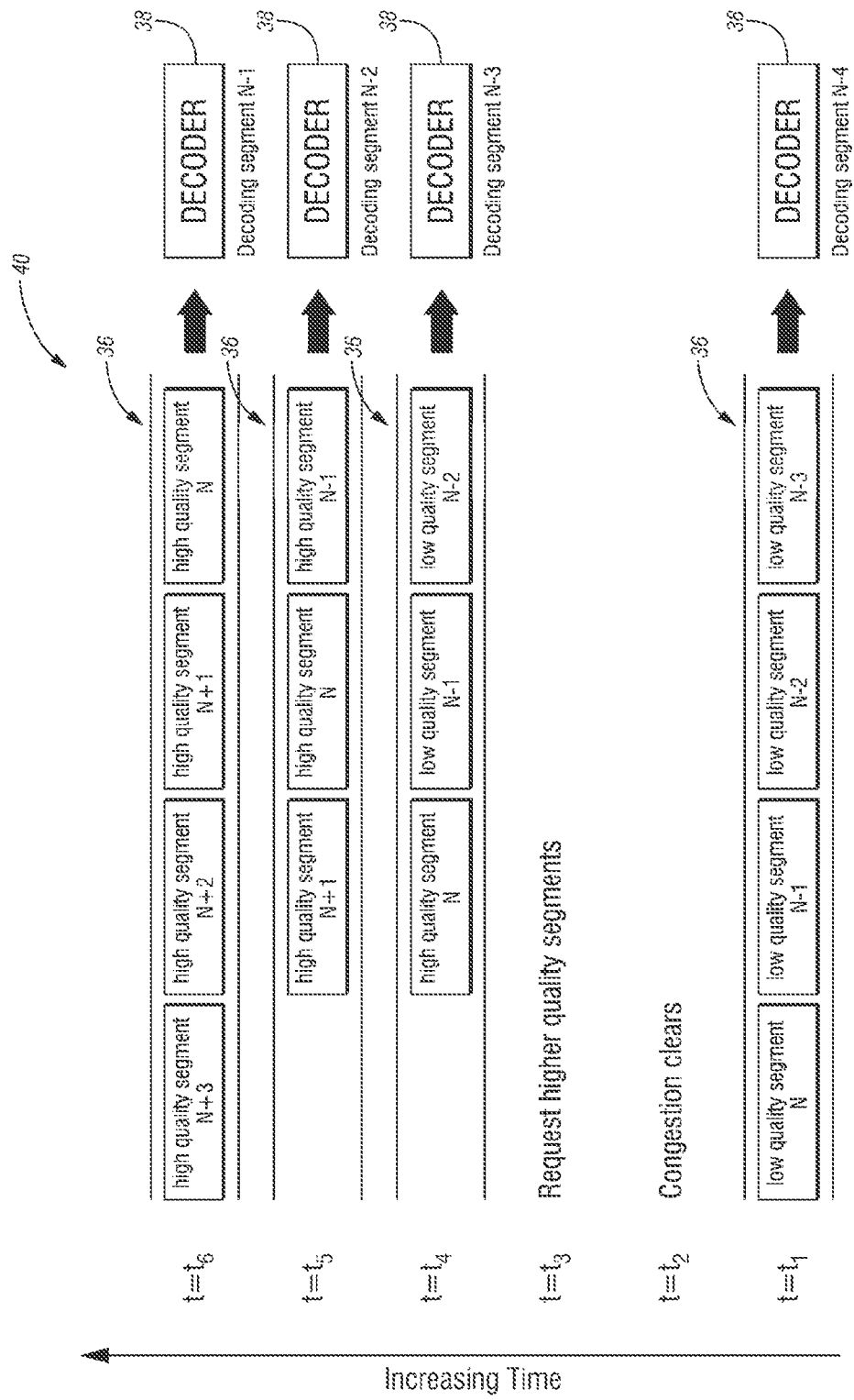
FIG. 3 illustrates a flowchart for retransmitting queued content in accordance with one non-limiting aspect of the present invention.

FIG. 1 illustrates an adaptive bit rate system 10 in accordance with one non-limiting aspect of the present invention. The system 10 is shown with respect to supporting data transfer between a client 12 and a server 14 with communications executed over a network 16. This type of client-server arrangement may take place between any two devices where data is transmitted according to an adaptive bit rate model of the type where a bit rate at which the data is transferred or encode for transfer can be adjusted according to network characteristics, such as congestion, latency, and other influences that affect how quickly the server 14 is able to reliably transmit data to the client 12.

The present invention is predominately described with respect to adapting the selection of whether higher and lower bit rate encoded video is transmitted transported to the client 12 based at least in part on network congestion. The description is provided for exemplary purpose and without intending to unnecessarily limit the scope and contemplation of the present invention. The transfer of video, or more particularly video segments, is but one of many environments where adaptive bit rate methodologies may be utilized in cooperation with the present invention to provide an uninterrupted flow of data segments at the highest possible bit rate levels without negatively influencing the user's experience due to chatter or other variations induced by overly active bit rate adjustments.

The transfer of video or other data from the server 14 to the client 12 may take place over any type or combination of a wireless network (Wi-Fi, satellite, cellular, telephony, etc.) and/or a wireline network (coaxial cable, Ethernet, USB, home power network, etc.). Optionally, different communication protocols, codecs, standards and communication mediums may be simultaneously relied upon to execute the operations contemplated by the present invention depending on the operating demands and capabilities of each of the client 12 and server 14. The server 14 may be configured to dynamically support communications over different and/or multiple networks 16 and according to different requirements in order to facilitate uninterrupted video viewing while the client 12 transitions from one network 16 to another.

The client 12 may be any type of device capable of processing data and/or media for output to a user, such as but not limited to one or some combination of a television, settop box (STB), computer, notebook, mobile device (phone, pda, tablet, etc.) The server 14 may be any type of device capable of transmitting data and/or interfacing media with a user through the client 12, such as but not limited to one or some combination of a digital video recorder (DVR), headend unit, computer, mobile device (phone, pda, etc.)

The server 14 is shown to include a transmitter 20 operably configured to facilitate transmitting video and/or other data to the client 12, including performing any formatting conversions and related transmission-dependent operations in order to facilitate transmitting video to the client 12. The transmitter 20, in particular, may be configured to encode the video at selected bit rates and/or to select between video segments/files previously encoded at certain bit rates. The client 12 may include a rate controller 22 operatively configured to select the bit rate of the video sent from the transmitter 20 according to historical behavior, network congestion, and other influences. Of course, the rate controller 22 may be included as part of the server 14 and/or another element in communication with either one or both of the server 14 and client 12.

FIG. 2 illustrates a bit rate map 30 in accordance with one non-limiting aspect of the resent invention. The bit rate map 30 may be stored in one or both the server 14 and client 12 for use in mapping a listing of available bit rates relative to a listing of network congestion levels. One or both of the client 12 and server 14 may included capabilities to assess or otherwise measure network congestion NC, or at least congestion of a pathway or medium currently being used to transmit the video to the client 12, such as based on congestion levels perceived from each. The perceived network congestion NC may be mapped to the one of a plurality of bit rates A, B, C, Z used to encode the video segments or other content segments capable of being transmitted to the client 12.

The perceived congestion levels may be determined from test messages sent over the network 16 that track travel time between destinations, reports from intermediary devices (hops) used to support communications between the client 12 and server 14, statistics gathered in the client's TCP/IP network stack, and/or the level of fullness in a buffer holding the data being transmitted. The bit rate map 30 is but one tool for relating bit rates to network congestion and is not intended to the limit the scope and contemplation of the present invention, particularly when the present invention is used in cooperation with non-video restricted data transfers. Other arrangements, based on other variables, may similarly be used, such as but not limited to a formula that calculates a specific bit rate based on network congestion, i.e., one that does not require relating network congestion to a predefined listing of available bit rates.

The listing of predefined bit rates is merely presented as some video formatting may have defined ranges at which it can be preferably encoded, which may be due at least in part to formatting requirements, video quality, expected network link bandwidths and other operation processes. In addition, the present invention refers to bit rate with respect to the bit rate at which the video segments or other content segments are encoded for transport over the network 16. For example, video segments corresponding to the same portion of a video may be encoded at higher and lower bit rate. The higher bit rate encoding results in more data being included for the same length of video than that which would be included at the lower bit rates. The higher bit rate encoding also results in better quality video and greater allocation of network resources to support the related transmission requirements due to the increased size of the higher quality segments. The server 14 may be configured to encode the video in upon request and/or the server 14 may include pre-encoded video segments/files that are to be transported at the request of the client 12.

Optionally, the bit rate at which the encoded video segments are transmitted over the network 16 may be similarly controlled in the event the network 16 is of the type that permits such control. The network 16 predominately described by the present invention endeavors to transport the video segments in the faster manner possible, and in some cases, with the assistance of compression and other processing techniques that may be used to adjust the transfer bit rate of the video segments. The ability of the present invention to controller the bit rate of the encoded video also allows the present invention to control the amount of time taken to transport the video segments at least in so far as the transport time is proportional to the size of the segments, i.e., whether the video segments are encoded at higher or lower bit rates.

One non-limiting aspect contemplates the rate controller 22 or some other sufficiently operable device being configured to facilitate retransmitting or otherwise replacing lesser bit rate encoded data with greater bit rate encoded data. This capability may be beneficial in replacing lower quality data, generally data associated with lower bit rates, with higher quality data, generally data associated with higher bit rates. One such scenario relates to transmission of a video where the video is segmented into a plurality of video segments for transport. The video segments may be transmitted from the server 14 and re-assembled at the client 12 for playback. The client 12 may include a queue 36 and a decoder 38, and if necessary other elements, to facilitate playback of the video segments.

FIG. 3 illustrates a flowchart 40 for retransmitting content queued within the queue 36 or other suitable memory in accordance with one non-limiting aspect of the present invention. The queue 36 may be a memory or a buffer operable to store the video segments on the client 12 and/or remotely on a device associated therewith. The queue 36 may be used organize or otherwise arrange content segments prior to decode by the decoder 38. The queue 36, depending on its memory capacity and the size of the video segments, may be operable to queue an N number of video segments.

The queue 36 may be operable in a circular, first-in-fist-out (FIFO) manner such that the first received video segment is output to the decoder 38 for decode and playback prior to later received video segments. The video segment closest to the decoder, i.e. the video segment to be the next video segment decoded by the decoder, is labeled as video segment N−3, with the following video segments being labeled as N−2, the next following being labeled N−1, and the farthest, or last video segment, being labeled N. As additional video segments are received with the decoding of early video segments, the newly received video segments are incrementally labeled N+1, N+2, etc.

The queue 356 is shown to be operable for queuing four video segments (N, N−1, N−2, and N−3) for exemplary purposes and may be operable to queue any number of video segments. In the event the video desired for playback is segmented into X total number of video segments, the queue may be operable to store all X number of video segments, i.e., X=N, within the allocated memory locations. The segmenting of the video into the X number of video segments may vary depending on any number of factors, such as video size, codec/protocol requirements, network restrictions, etc. One non-limiting aspect of the present invention contemplates the server being operable to output the video segments at different levels of quality. For exemplary purposes, two quality levels, a higher quality video segment and a lower quality video segment, are discussed, however, the present invention fully contemplates the server being operable to output the video segments at more than two different levels of quality.

The lower quality video segments may contain data sufficient to support playback of a corresponding portion of the video at standard definition (SD) while the higher quality video segment may contain data sufficient to support playback of a corresponding portion of the video at high definition (HD) or at some other level greater than the lower quality video segments. Of course, any other quality distinction may be made to distinguish higher quality video segments from lower quality video segments. The lower quality video segments may be representative of video transmitted encoded at 512 Kbits/second (Kbps) while the higher quality video segment may be representative of video transmitted encoded at 2.5 Mbit/second (Mbps).

The selection of whether to transmit the video segments as high or low quality video segment may be made by the rate controller 22 as a function of output capabilities of the client 12, e.g., the client 12 may not have processing capability to decode the higher quality video segments, as a function of network congestion, and/or as a function of other variables, such as the number of tasks being serviced in a multi-tasking operating system. The rate controller 22 may be operable to test the variables relevant to determining whether to transmit higher or lower quality video segments and/or the client 12 may be operable to instruct the server 14 to transmit the video segments at a desired bit rate.

One non-limiting aspect of the present invention contemplates the rate controller 22 being operable to facilitate the transmission of lower quality video segments when network congestion is high and higher quality video segments when network congestion is low. As shown in the bit rate map of FIG. 2, the selection of higher and lower quality video segments may be mapped to network congestion levels. The rate controller 22 and/or the server 14 may be operable to assess network congestion using test message and/or other techniques. The rate controller 22 may also be operable to select transmission of the higher and lower quality video segments according to requests or instructions received from the client 12. Each of the server 14 and the client 12 may be operable to specifically identify each of the X number of segments of the video and to particularly request retransmission of each as higher or lower quality video segments.

FIG. 3 schematically illustrates a period of time, represented by time intervals t1, t2, t3, t4, t5, t6, during which video segments are transmitted as higher and lower quality video segments in accordance with one non-limiting aspect of the present invention. At time t1, the queue is shown to have been populated with only lower quality video segments, which may occur, for example, in the event network congestion was relatively high at the time when the queued video segments were transmitted to the client 12. At time t2, the network congestion levels are determined by the client 12 and/or sever 14 to have dropped sufficiently to allow for video segments to be transmitted as higher quality video segments. At time t3, a request may be made to begin retransmitting the video segments as higher quality video segments to take advantage of the decreased network congestion and to improve the user experience The request sent at t3 is described predominantly as originating from the client 12, but it may also originate from the server 14. The request may be used to identify a replacement of one or more video segments. The replacement video segments may be selected to replace video segments already within the queue, i.e., to replace one of the video segments already stored at the memory locations associated with the queue positions N, N−1, N−2, and/or N−3. The ability to not only increase the quality of the video segments after beginning playback but to also increase the video quality of video segments already within the queue may be beneficial in more rapidly increasing video quality when network congestion or other operating restrictions lessen. The is allows the presenting invention begin replacing the queued video segments with higher quality video segments before the queued lower quality video segments are decoded.

The beginning of the replacement video segments may be selected depending on an amount of decode time taken to decode each queued video segment versus the amount of time taken to transmit and queue the replacement video segments, i.e., the retransmitted video segments. FIG. 3 illustrates selecting, at time interval t4, the last or farthest queued video segment N for replacement. Of course, the present invention is not intended to be limited to beginning replacement of the video segments with the farthest queued video segment N and fully contemplates beginning replacement at earlier queued video segments N−1, N−2 and N−3, particularly at the queued position closest to the decoder that can still be provided while maintaining consistent, uninterrupted playback of the video. This may include assessing the level of network congestion, or the amount of decrease thereof, and determining how closely to the decoder to begin replacing the video segments.

Optionally, after replacing the last queued video segment N, retransmission of an early video segment may be requested if time permits. As shown, as sufficient amount of time permitted the early, lower video segment N−1 to be replaced with retransmitted, higher quality video segment N−1. Thereafter, in a FIFO manner, higher quality video segments for introducing newer, higher quality video segments (i.e., video segments that were not already in the queue) may also be received at time intervals t5 and t6 such that the queue becomes filled with new, higher quality video segments N+1, N+2, N+3. Optionally, separate requests may be issued for each of the video segments, i.e., of the next video segments N+1, N+2, N+3 may be requested in separate messages.

The illustration of FIG. 3 intends to show the replacement of video segments having the same length, or covering the same time span or content as that which was covered by the lower quality video segments being replaced. This may not always being the case, particularly if the higher quality video segments cover more or less of the video than the to be replaced lower quality video segment. In this event, more or less higher quality video segment may be requested to insure continuous playback. Optionally, the video segments can be transmittable at a controllable length such that the lengths may be selected by the client 12 and/or server 14 to correspond with the length of the to be replace queued video segments.

The playback of the queued video segments may be facilitated with memory pointers that identify memory locations within the memory at which the video segments are stored. The pointers may be arranged by the decoder 38 or a scheduling agent according to the circular, FIFO scheduling practice such that the decoder 38 can simply retrieve the video segment to be decoded according to the pointer assigned thereto. In the case of replacing an already queued video segment, the pointer used to locate that video segment may be changed to instead point to the memory location of the replacement video segment. In this manner, the replacement video segment need not be stored at the same location as the replaced video segment. Of course, the present invention does not necessarily require the use or rescheduling of pointers and may similarly operate by actually storing the replacement video segments over the replaced video segments, i.e., such that the decoder 38 is essentially unaware of any changes.

As supported above, one non-limiting aspect of the present invention relates to an improved adaptive bit rate method and system that can be used to improve performance of digital video delivery systems on shared networks by dynamically optimizing for network throughput to deliver a higher quality and more consistent viewing experience. One non-limiting aspect of the present invention relates to a "retransmit and replace" method for improving video viewing experience, which may include an adaptive bit rate method and system that recognizes encoded video traffic is normally stored in a user's or client's buffer until such time as decoding is necessary. In this situation, the client may have a buffer full of low quality video, even though the network has cleared of congestion and higher quality video is available. The present invention is able to capitalize on this by replacing the low quality video before it is streamed from the buffer to the decoder since it may be desirable to replace the low quality video with higher quality video during this period of time to improve viewer experience. The received assemblage of low quality and high quality video packets may be stored in a buffer by a video player. While waiting in the buffer to be decoded and streamed to the display device, the invention selectively requests for retransmission a higher quality version of an already-received lower quality video segment, and replaces the lower quality video segment with the higher quality video segment, when the available network throughput increases sufficiently to allow for such retransmission.

This improves the video viewing experience for the user by replacing lower quality video segments with higher quality video segments.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of scheduling decoding of higher and lower quality video segments for output to a display, the higher and lower quality video segments being respectively transmitted at a higher bit rate and a lower bit rate, the method comprising: receiving a first plurality of the lower quality video segments following transmission over a network; queuing the first plurality of video segments within a memory; identifying a memory location for each of the first plurality of video segments queued within the memory with a pointer; scheduling the pointers for the first plurality of video segments according to a circular, first-in-first-out (FIFO) decoding schedule; receiving a second plurality of the higher quality video segments following transmission over the network; queuing the second plurality of video segments within the memory; identifying a memory location for each of the second plurality of video segments with a pointer; and replacing the pointers in the decoding schedule for one or more of the first plurality of video segments with the pointer of one or more of the second plurality of video segments having matching video, referred to as matching video segments, thereby causing the matching video segments to be decoded for output to the display instead of the corresponding lower quality video segments, referred to as replaced video segments.

2. The method of claim 1 further comprising requesting transmission of the matching video segments with a transmission request transmitted after queuing at least one of the first plurality of video segments, thereby causing the matching video segments to be transmitted after queuing of the replaced video segments.

3. The method of claim 2 further comprising determining the matching video segments to be requested in the transmission request as a function of a decode time associated with the replaced video segments such that matching video segments occurring later in time are requested if the decode time is longer and matching video segment occurring sooner in time are requested if the decode time is shorter, the decode time corresponding with an amount of time required to decode each of the replaced video segments.

4. The method of claim 3 further comprising determining the matching video segments to be requested in the transmission request as a function of network congestion such that matching video segments occurring later in time are requested if the network congestion is higher and matching video segment occurring sooner in time are requested if the decode time is lower, the network congestion reflecting an amount of time required to transmit and queue the matching video segments.

5. The method of claim 1 further comprising instructing a decoder to begin decoding the first plurality of video segments for output to the display according to the decoding schedule such that at least a portion of the first plurality of video segments are output to the display prior to replacing the pointers in the decoding schedule.

6. A method of facilitating playback of a video with a device wherein the video is segmented into a plurality of video segments prior to being transmitted to the device, the method comprising:
   requesting a first transmission to the device of at least a first portion of the plurality of the video segments encoded at a first bit rate;
   instigating a first queuing wherein the first portion are queued on the device for playback, including assigning one of a plurality of first pointers to each of the first portion to facilitate playback;
   requesting a second transmission of a second portion of the plurality of the video segments encoded at a second bit rate, the second portion corresponding with one or more of the first portion and the second bit rate being greater than the first bit rate; and
   instigating a second queuing wherein one or more video segments encoded at the second bit rate are each queued on the device for playback, including assigning one of a plurality of second pointers to each of the second portion to facilitate playback, at least one of the second pointers being assigned in place of one or more the first pointers such that at least one of the video segments encoded at the second bit rates playback in place of at least of video segments transmitted at the first bit rate.

7. The method of claim 6 further comprising requesting the first transmission according to network congestion associated with transmitting video segments to the device.

8. The method of claim 7 further comprising determining an amount of decrease in network congestion after queuing the first portion of the plurality of the video segments and requesting the second transmission according to the amount of decrease in network congestion.

9. The method of claim 8 further comprising determining a number of video segments being requested for retransmission based on the amount of decrease in network congestion.

10. The method of claim 6 further comprising instigating playback according to the first queuing, and thereafter, instigating playback according to the second queuing.

11. The method of claim 6 further comprising requesting a third transmission of at least a third portion of the plurality of video segments in the event network congestion increases above a threshold after the requesting the second transmission, the third transmission requesting transmission of the third portion of the plurality of video segments encoded at one of the first bit rate and a third bit rate, the third bit rate being less than the second bit rate.

12. The method of claim 11 further comprising instigating a third queuing wherein the third portion of the plurality of video segments encoded at the one of the first bit rate and the third bit rate are queued on the device for playback.

13. The method of claim 12 further comprising: requesting a fourth transmission of one or more of the third portion of the plurality of the video segments encoded at one of the second bit rate and a fourth bit rate, the fourth bit rate being greater than the one of the first bit rate and the third bit rate of the third transmission; and instigating a fourth queuing wherein one or more video segments encoded at the one of the third bit rate and the fourth bit rate are each queued in place of one or more video segments transmitted at the first bit rate.

14. A non-transitory computer-readable medium having instructions operable to facilitate dynamically adjusting decoding of higher and lower quality content segments, the non-transitory computer-readable medium comprising instructions sufficient to facilitate: determining receipt of one or more lower quality content segments at a device following transmission over a network; queuing the one or more lower quality content segments on the device for subsequent decode; determining receipt of one or more higher quality content segments at the device following transmission over the network; queuing one or more of the higher quality content segments on the device for subsequent decode, a matching plurality of the one or more of the higher quality content segments having the same content as one or more of the lower quality content segments also queued on the device; and decoding on the device the at least one of the matching plurality of higher quality content segments instead of the one or more of the queued lower quality content segments having the same content, including changing one or more pointers pointing towards the lower quality segments to point towards the higher quality segments.

15. The method of claim 14 further comprising requesting transport of the at least one of the one or more higher quality content segments after queuing the one or more of the lower quality content segments.

16. The method of claim 15 further comprising requesting transport of the at least one of the one or more higher quality content segments only in the event network congestion of a network used to transport the content segments to the playback device decreases by a predefined amount relative to network congestion of the network at a time of transporting the one or more queued lower quality content segments to the playback device.

17. The method of claim 14 further comprising determining receipt of the higher and lower content segments at the device as higher and lower quality video segments according to information transmitted therewith from a server.

18. The method of claim 17 further comprising transmitting a request to the server from the device, the server responsively encoding the content segments to be higher and lower quality video segments by adapting a bit rate used to encoded the video segments according to information include with the request.

19. The non-transitory computer-readable medium of claim 14 further comprising instructions sufficient for decoding the at least one of the matching plurality of higher quality content segments instead of the one or more of the queued lower quality content segments having the same content by changing the pointer for a decoder of the device from at least a first position to at least second position, the first position directing the decoder to decode one of the queued lower quality content segments and the second position directing the decoder to decode one of the matching plurality of higher quality content segments.

20. The method of claim 6 further comprising instigating the second queuing by changing at least one pointer for a decoder of the device.

* * * * *